United States Patent [19]

Endoh et al.

[11] Patent Number: 5,121,222

[45] Date of Patent: Jun. 9, 1992

[54] METHOD AND APPARATUS FOR PRODUCING BINARY PICTURE WITH DETECTION AND RETENTION OF PLURAL BINARY PICTURE BLOCKS HAVING A THIN LINE PATTERN INCLUDING AN OBLIQUE LINE

[76] Inventors: Toshiaki Endoh; Hisaharu Kato, both of 4-14-8 Akatsuka, Itabashi-Ku, Tokyo-To; Seiichiro Ejima, 1-41-2 Toro-Machi, Ohmiya-Shi; Yasuhiro Yamazaki, 2-4-4 Tsukagoshi, Warabi-Shi, all of Japan

[21] Appl. No.: 739,796

[22] Filed: Aug. 1, 1991

Related U.S. Application Data

[63] Continuation of Ser. No. 531,944, Jun. 1, 1990, abandoned.

[30] Foreign Application Priority Data

Jun. 14, 1989 [JP] Japan .................................. 1-149411

[51] Int. Cl.⁵ .............................................. H04N 1/393
[52] U.S. Cl. ...................................... 358/451; 358/448
[58] Field of Search ............... 358/298, 448, 451, 453, 358/455, 456, 458, 462, 464, 467, 443

[56] References Cited

U.S. PATENT DOCUMENTS

4,783,838 11/1988 Matsunawa .......................... 358/451

Primary Examiner—Benjamin R. Fuller
Assistant Examiner—Scott A. Rogers

[57] ABSTRACT

Binary picture reducing method and apparatus are disclosed, wherein an original picture is divided for a block of a pattern matrix composed of a predetermined number of picture elements, thereby extracting a plurality of binary picture blocks. When the plurality of binary picture blocks each agree with a predetermined thin line pattern, the binary picture block is detected as a thin line block. The thin line block thus detected is retained on an output picture at a position corresponding to a predetermined reduction ratio.

2 Claims, 4 Drawing Sheets

METHOD AND APPARATUS FOR PRODUCING BINARY PICTURE WITH DETECTION AND RETENTION OF PLURAL BINARY PICTURE BLOCKS HAVING A THIN LINE PATTERN INCLUDING AN OBLIQUE LINE

This is a continuation of application Ser. No. 07/531,944, filed June 1, 1990 now abandoned.

BACKGROUND OF THE INVENTION

The present invention relates to processing for the production of a reduced picture of a binary picture.

In present G4 facsimile 200, 240, 300 and 400 ppi (Pels/inch) are used as standardized resolution for paper sizes of ISO A4, ISO B4 and ISO A3. Pictures of such various paper sizes and such various resolutions are now employed in facsimile, and the conversion of resolution (a picture reducing system) is requisite for the intercommunication of pictures of different paper sizes and resolutions. A variety of picture reducing systems have been proposed. Typical systems are such as follows:

(1) SPC method (Gobo and Kirihara: One system for conversion of facsimile line density, Processing of National Conference of the Institute of Image Electronics Engineers of Japan, Vol. 7, No. 1, (1978))

This is a system which uses that one of picture elements on the original picture which is the closest to the picture element on a reduced picture.

(2) Projection method (Morita, Komachi and Yasuda: System for high-speed conversion of picture element density based on projection method, The Journal of the Institute of Image Engineers of Japan, Vol. 11, No. 2, (1982), for example) This is a system in which the mean density of original picture elements projected onto picture elements of a reduced picture is obtained and the value is processed using a threshold value to obtain the value of each picture element.

A system that has been proposed to retain thin lines is a TP method (Wakabayashi, Kawanishi and Adachi: Reduction and conversion method which prevents erasure of thin lines, The Transactions of the Institute of Electronics, Information and Communication Engineers of Japan, Vol. J70-D, No. 4 (1989. 7), for example), but this method is directed to the retention of vertical and lateral lines and does not take oblique lines into account. Thus, the conventional picture reducing systems are poor in the retention of thin line, and hence suffer from serious deterioration of picture quality.

SUMMARY OF THE INVENTION

It is therefore an object of the present invention to provide a binary picture reducing method and apparatus which permit retention of thin lines including oblique lines with decreasing degredation of the picture quality.

To attain the above objective, the binary picture reducing method and apparatus of the present invention are constituted as follows:

(1) A binary picture reducing method comprising:

a first step wherein an original picture is divided for a block of a pattern matrix composed of a predetermined number of picture elements, thereby extracting a plurality of binary picture blocks;

a second step wherein, when the plurality of binary picture blocks each agree with a predetermined thin line pattern, the binary picture block is detected as a thin line block; and a third step wherein the thin line block thus detected is retained on an output picture at a position corresponding to a predetermined reduction ratio.

(2) A binary picture reducing apparatus comprising:

blocking means whereby an original picture is divided for a block of a pattern matrix composed of a predetermined number of picture elements to thereby extract a plurality of binary picture blocks;

decision means whereby, when the plurality of binary picture blocks each agree with a predetermined thin line pattern, the binary picture block is detected as a thin line block; and retaining means whereby the thin line block thus detected is retained on an output picture at a position corresponding to a predetermined reduction ratio.

BRIEF DESCRIPTION OF THE DRAWINGS

The present invention will be described in detail below with reference to accompanying drawings, in which.

DETAILED DESCRIPTION

Figure 1:
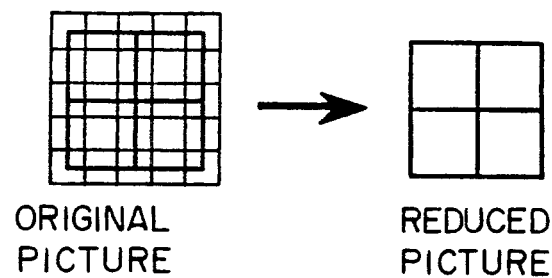
FIG. 1 is a pattern diagram shown an example in which thin lines disappear in the cases of the SPC method and the projection method.

In general, the SPC method and the projection method are poor in the retention of thin lines. FIG. 1 shows an example in which thin lines disappear. These defects can be eliminated in accordance with the present invention.

The present invention will hereinafter be described in detail.

Figure 2:
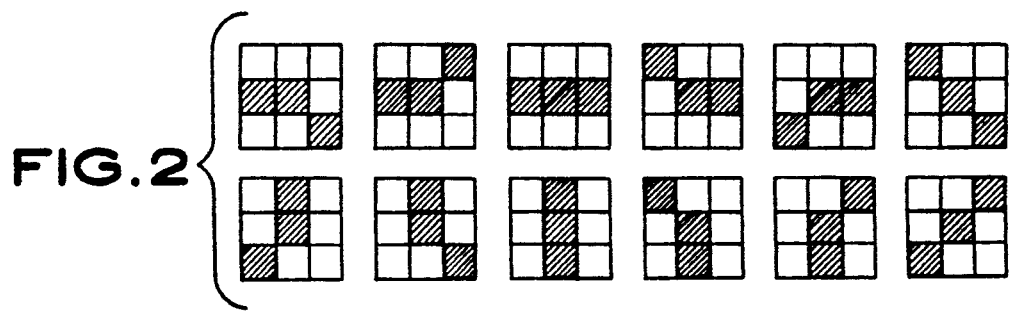
FIG. 2 shows examples of thin line decision patterns.

Whether a thin line is to be retained or not is determined depending on whether or not is agrees with such a 3×3 mask pattern as shown in FIG. 2. A white thin line pattern on a black background can be checked by use of a black and white reversed pattern of the 3×3 mask pattern depicted in FIG. 2. For the sake of brevity, the following description will be given using only the pattern shown in FIG. 2.

Figure 3:
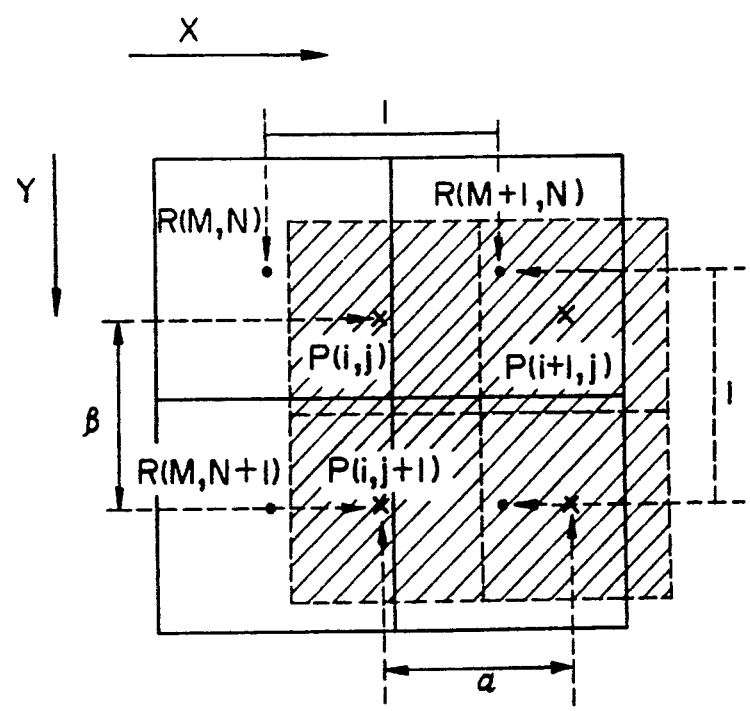
FIG. 3 is a pattern diagram showing the relationship between an original picture and its reduced picture.

The relationship between an original picture and a reduced one is defined as shown in FIG. 3.

R(M, N) (M, N=0, 1, 2, . . . ): original picture

R(M, N)=1: black picture element

R(M, N)=0: white picture element

P(i, j) (i, j=0, 1, 2, . . . ): reduced picture

P(i, j)=1: black picture element

P(i, j)=0: white picture element

Let it be assumed that the coordinates (M, N) are positioned at the center of the picture element (N, N) and the coordinates (i, j) at the center of the picture element P(i, j).

The picture element spacings of the original picture in vertical and horizontal directions are normalized with 1. Since the reduction ratios in the horizontal and vertical directions are $\alpha$ and $\beta$, respectively, the picture element spacings of the reduced picture in the horizontal and vertical directions are $\alpha$ and $\beta$ on the original picture. Further, the coordinates of the picture element P(i, j) on the reduced picture are defined as $x_i$, $y_i$, and $s_i$, $t_j$ are defined as follows:

$$s_i = [x_i] \quad (1)$$

$$t_j = [y_j] \quad (2)$$

[] being Gauss' notation.

Algorithm 1

Features of algorithm 1 will hereinbelow be given.

(1) Letting the reduction ratios in the horizontal and vertical directions be represented by $\alpha$ and $\beta$, respectively, the following reductions can be effected:

$$\alpha = Mx/Nx$$

(Mx and Nx being natural numbers, where Mx = 1, ..., Nx − 1)

$$\beta = My/Ny$$

(My and Ny being natural numbers, where My = 1, ..., Ny − 1)

(2) No thin lines are erased on the reduced picture.

(3) Picture elements of the original picture can sequentially be processed following a left to right, top to bottom scanning system.

Step 1:

Zeros are set in all picture elements on the reduced picture R(m, n) (m, n = 1, 2, 3, ...).

$$i \leftarrow 1, j \leftarrow 1$$

Step 2:

A 3×3 pattern composed of the picture element P(i, j) and eight neighboring picture elements is obtained, and it is checked whether or not this pattern agrees with the 3×3 mask pattern shown in FIG. 2. If they agree, then set $$R(s_i, t_j) \leftarrow 1.$$

Step 3:

The address of the next picture element is set by updating i, j.

Step 4:

The process is finished after all picture elements are processed. If not, the process returns to step 2.

With the algorithm 1, thin lines are not erased on the reduced picture but may sometimes become thick.

Next, a description will be given of an algorithm which retains thin lines intact on a reduced picture.

(Algorithm 2)

Features of the algorithm 2 are as follows:

(1) Letting the reduction ratios in the horizontal and vertical directions be represented by $\alpha$ and $\beta$, respectively, the following reduction is possible:

$$\alpha = Mx/Nx$$

(Mx and Nx being natural numbers, where Mx = 1, ..., Nx − 1)

$$\beta = My/Ny$$

(My and Ny being natural numbers, where My = 1, ..., Ny − 1)

(2) No thin lines are erased on the reduced picture.

Figure 4:
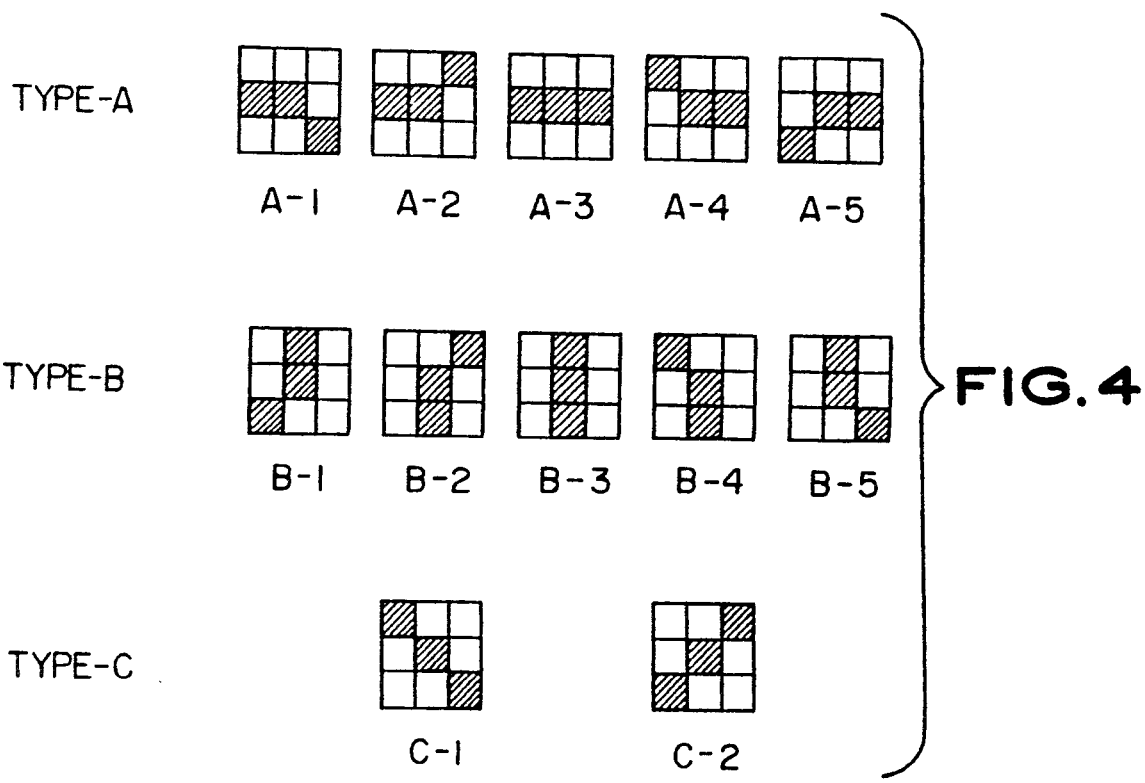
FIG. 4 is a pattern diagram showing the classification of thin line retaining patterns.
Figure 5:
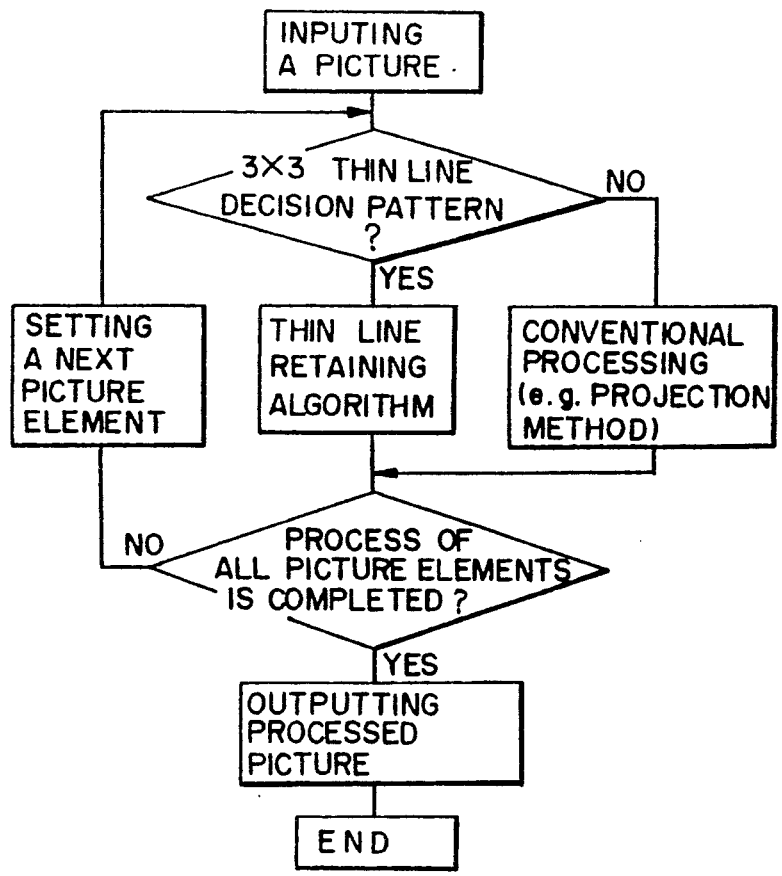
FIG. 5 is a process flowchart for using this invention system and a conventional system individually in dependence on whether the process being performed is thin line processing or not.

(3) Picture elements of the original picture can be sequentially processed following the left to right, top to down scanning system which is employed in facsimile. Thin line decision patterns are classified into three types are shown in FIG. 4. With type A mainly indicative of a horizontal line and type B mainly indicative of a vertical line it is basically necessary to take into account the retention of lines in the X or Y direction. As for the type C indicative of an oblique line, the retention of lines in both of the X and Y directions must be taken into consideration.

This algorithm will hereinbelow be described.

Step 1:

Zeros are set in all picture elements of the reduced picture R(m, n) (n, n+1, 2, 3, ...)

$$i \leftarrow 1, j \leftarrow 1$$

Step 2:

A 3×3 pattern composed of the picture element R(i, j) and eight neighboring picture elements is obtained and it is checked whether or not this pattern agrees with the 3×3 mask pattern shown in FIG. 4. If they do not agree, then the process proceeds to step 5.

Step 3:

If $R(s_i, t_j) = 1$, the process proceeds to step 5.

Step 4:

The process follows the following procedure.

In the case of type A (A−1 ~ A−5):

$R(s_i, t_j) \leftarrow 1: R(s_i, t_j-1) = 0$      (Condition A-a)

In the case of type A - 1, A - 5:

$R(s_i, t_j) \leftarrow 1: R(s_i, t_j-1) = 1$ and $t_j \neq t_{j+1}$      (Condition A-b)

In the case of type B (B−1 ~ B−5):

$R(s_i, t_j) \leftarrow 1: R(s_i-1, t_j) + R(s_i+1, t_j) = 0$      (Condition B-a)

In the case of type B−1:

$R(s_i, t_j) \leftarrow 1: R(s_i+1, t_j) = 1$ and $s_i \neq s_{i-1}$      (Condition B-b)

In the case of type B - 5:

$R(s_i, t_j) \leftarrow 1: R(s_i-1, t_j) = 1$ and $s_i \neq s_{i+1}$      (Condition B-c)

In the case of type C - 1:

$R(s_i, t_j) \leftarrow 1: R(s_i-1, t_j) = 0$ and $R(s_i, t_j-1) = 0$      (Condition C-1a)

$R(s_{i+1}, t_j) \leftarrow 1: R(s_i-1, t_j) = 0 \; R(s_i, t_j-1) = 1$ and $t_j \neq t_{j+1}$      (Condition C-1b)

$R(s_i, t_{j+1}) \leftarrow 1: R(s_i-1, t_j)=1 \ R(s_i, t_j-1)=0 \ and$
$s_i \neq s_{i+1}$  (Condition C-1c)

In the case of type C - 2:

$R(s_i, t_j) \leftarrow 1: R(s_i-1, t_j)+R(s_i+1, t_j)=1 \ and \ R(s_i, t_j-1)=0$  (condition C-2a)

$R(s_{i+1}, t_j) \leftarrow 1: R(s_i+1, t_j)=0, R(s_i, t_j-1)=1 \ and$
$t_j \neq t_{j+1}$  (Condition C-2b)

$R(s_i, t_{j+1}) \leftarrow 1: R(s_i+1, t_j)=1, R(s_i, t_j-1) \ and$
$s_i \neq s_{i-1}$  (Condition C-2c)

Step 5:
i, j are updated and the address of the next picture element is set.

Step 6:
The process is finished when all picture elements have been processed. If not, then the process proceeds to step 2.

In this algorithm 2 the reduction ratio $\alpha$ in the horizontal direction and the reduction ratio $\beta$ in the vertical direction are limited as follows:

$$\alpha = Mx/Nx$$

(Mx and Nx being natural numbers, where Mx=Nx/2, ..., Nx−1)

$$\beta = My/Ny$$

(My and Ny being natural numbers, where My=Ny/2, ..., Ny−1)

In this instance, if the picture element at the center of the 3×3 pattern which agrees with the 3×3 mask pattern shown in FIG. 2 is referred to as a picture element forming a thin line, and if a picture element train composed of picture elements forming the thin line is defined as a thin line in the original picture, it is retained as a thin line also in the reduced picture through use of this algorithm 2.

Accordingly, the thin line is retained even if reduction processing is repeated a plurality of times. Hence, a picture can be reduced down to ½ or less by repeating the algorithm a plurality of times.

To overcome the defects of the prior art systems, it is also possible to combine them with this algorithm. In the case where picture elements on the original picture agree with the thin line decision pattern shown in FIG. 2, this algorithm is employed for determining picture elements to be reduced, and in other cases, the conventional systems are used. That is, in the case of the algorithm 1, processing of step 2 is incorporated into the block diagram of a thin line retaining algorithm shown in FIG. 7, and in the case of the algorithm 2, processing of steps 2 to 4 is incorporated.

Figure 6:
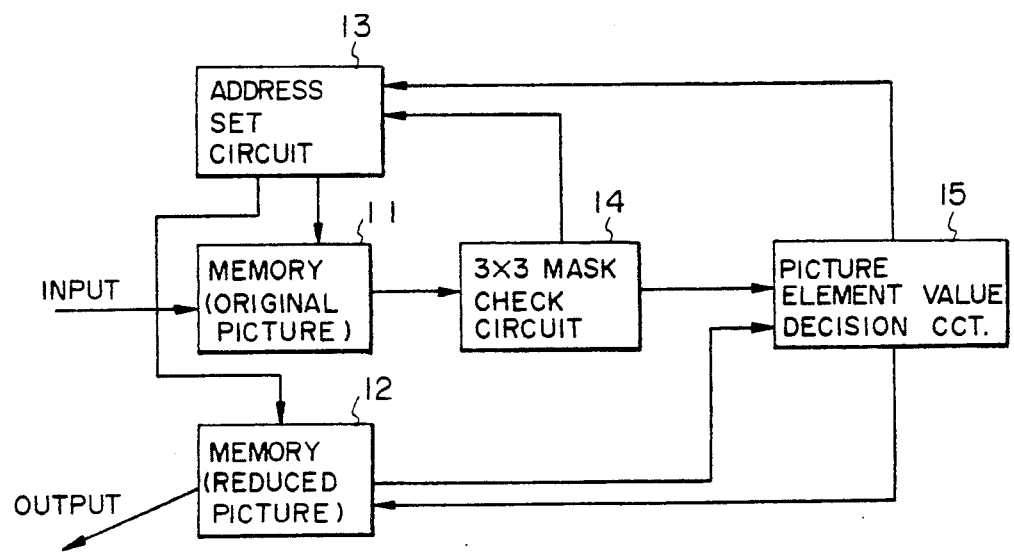
FIG. 6 is a block diagram showing the picture reduction processing according to the present invention.

Embodiment
Next, a detailed description will be given, with reference to the accompanying drawings, of an embodiment of the present invention. FIG. 6 is a block diagram illustrating the circuit arrangement for performing the algorithm 2. Reference numerals 11, 12, 13, 14 and 15 indicate a memory for an original picture, a memory for a reduced picture, an address set circuit, a 3×3 mask check circuit, and a picture element value decision circuit, respectively. At first, a picture to be processed is set in the original picture memory 11. The address set circuit 13 manages addresses of picture elements to be processed in the original picture memory 11 and addresses of picture elements to be processed in the reduced picture memory 12. The address set circuit 13 transfers to the 3×3 mask check circuit 14 the values of the picture element to be processed in the original picture memory 11 and eight adjoining picture element. The 3×3 mask check circuit 14 checks whether or not the picture element values agree with the pattern shown in FIG. 2. If they do not agree, then the mask check circuit instructs the address set circuit 13 to process the next picture element. If they agree, then the mask check circuit transfers to the picture element decision circuit 15 values of the picture element to be processed and the eight neighboring picture elements. The address set circuit 13 reads out of the reduced picture memory 12 a picture element associated with the picture element to be processed and transfers it to the picture element value decision circuit 15. The picture element value decision circuit 15 determines the reduced picture element value on the basis of steps 3 and 4 of the algorithm 2. Where the reduced picture value is determined to be 1 (i.e. a thin line retaining picture element), the value is written into the reduced picture memory 12 at an address received from the 3×3 mask check circuit 14. After this, the picture element value decision circuit 15 instructs the address set circuit 13 to process the next picture element. Where the reduced picture element value is 0 (i.e. not the thin line retaining picture element), the picture element value decision circuit 15 instructs the address set circuit 13 to process the next picture element. While in FIG. 6 there is shown an example of the circuit structure for performing the algorithm 2, a block diagram of an example of the circuit structure for executing the algorithm 1 can easily produced simply by modifying the contents of processing of the picture element value decision circuit 15.

Figure 7:
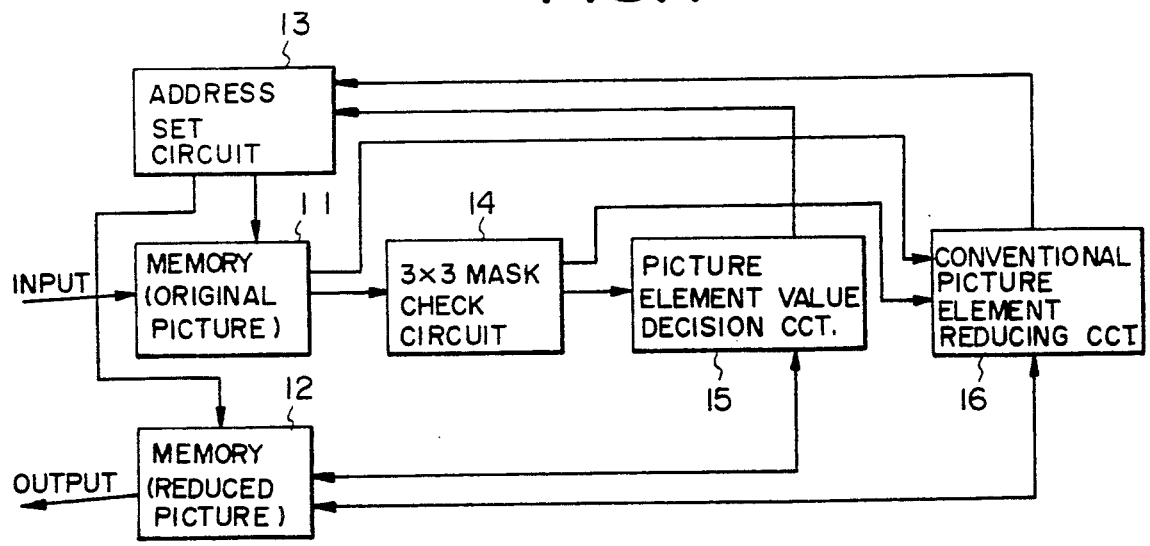
FIG. 7 is a block diagram in the case of using the picture reduction processing of the present invention and the conventional picture reduction processing in dependence on whether the process being performed is thin line processing or not.

FIG. 7 illustrates in block form an example of the circuit structure in the case where the algorithm 2 is combined with the prior art system. Reference numerals 11, 12, 13, 14, 15 and 16 indicate an original picture memory, a reduced picture memory, an address set circuit, a 3×3 mask check circuit, a picture element value decision circuit, and a conventional picture reducing circuit, respectively. The original picture memory 11, the reduced picture memory 12, the address set circuit 13 and the picture element value decision circuit 15 perform the same processing as are executed by those in FIG. 6. The 3×3 mask check circuit 14 checks whether or not values of the picture element to be processed and eight adjoining picture element agree with the pattern shown in FIG. 2. If they agree, the values of the picture element to be processed and the eight picture elements are transferred to the picture element value decision circuit 15. If they do not agree, the conventional picture reducing circuit 16 is instructed to process the picture element. The conventional picture element reducing circuit 16 reads out required picture element values from the original picture memory 11 and the reduced picture memory 12 and determines and writes the reduced picture element value into the reduced picture memory 12.

Figure 8:
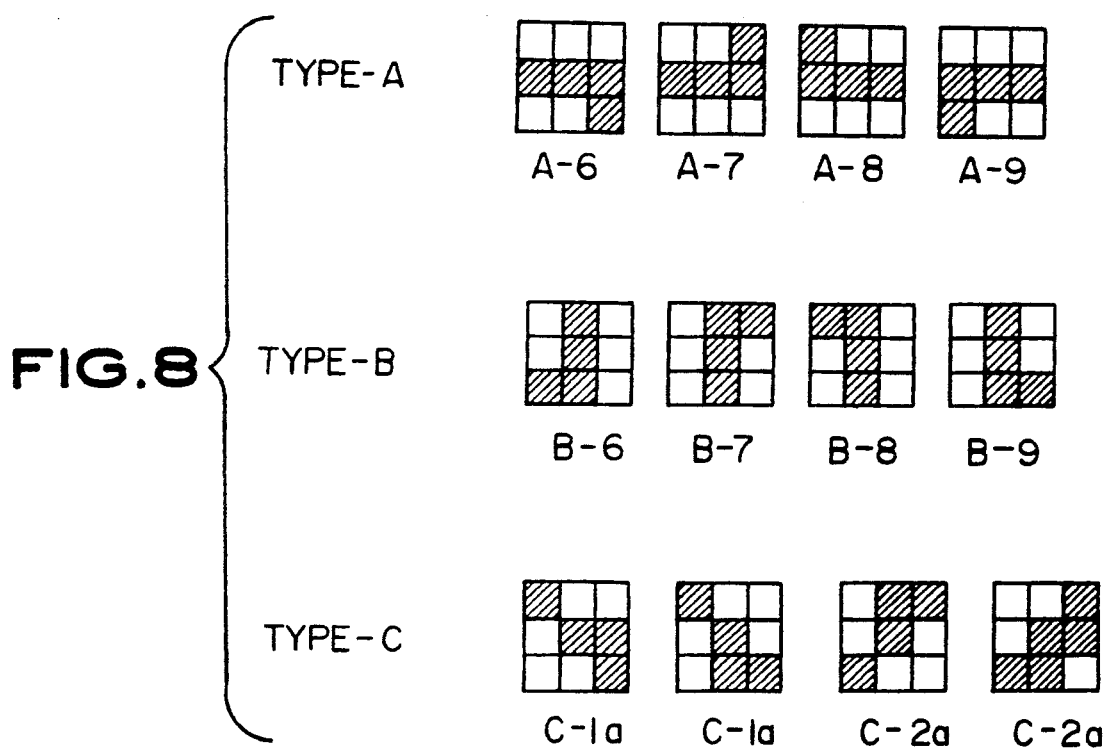
FIG. 8 is a diagram showing examples of additional thin line retaining patterns.

Although the above description has been given using the 3×3 pattern, it is also possible to employ different patterns as long as they permits the decision of a line element. For example, such patterns as shown in FIG. 8 can be utilized in addition to the patterns depicted in FIGS. 2 and 4. Moreover, the size of the pattern matrix need not always be limited to 3×3 but may also be 3×4, 4×3, 4×4, or 5×5, for instance. While in the above the algorithms 1 and 2 have been described as a simple and a detailed example of the thin line retaining algorithm of the present invention, other algorithms can also be employed. For instance, the conditions in step 4 of the algorithm 2 can be modified as follows:

EXAMPLE 1

Step 4: The process follows the following procedure.
In the case of type A:

$R(s_i, t_j) \leftarrow 1$

In the case of type B:

$R(s_i, t_j) \leftarrow 1$

In the case of type C-1:

$R(S_i, t_j) \leftarrow 1: R(s_i-1, t_j) = 0$ and $R(s_i, t_j-1) = 0$ (Condition C-1a)

$R(s_{i+1}, t_j) \leftarrow 1: T(s_i-1, t_j) = 0, R(s_i, t_j-1) = 0,$ and $t_j \neq t_{j+1}$ (Condition C-1b)

$R(s_i, t_{j+1}) \leftarrow 1: R(s_i-1, t_j) = 1, R(s_i, t_j-1) = 0,$ and $s_i \neq s_{i+1}$ (Condition C-1c)

In the case of type C-2:

$R(s_i, t_j) \leftarrow 1: R(s_i-1, t_j) + R(s_i+1, t_j) = 0,$ and $R(s_i, t_j-1) = 0$ (Condition C-2a)

$R(s_{i-1}, t_j) \leftarrow 1: R(s_i+1, t_j) = 0, R(s_i, t_j-1) = 1,$ and $t_j \neq t_{j+1}$ (Condition C-2b)

$R(s_i, t_{j+1}) \leftarrow 1: R(s_i+1, t_j) = 1, R(s_i, t_j-1) = 0,$ and $s_i \neq s_{i-1}$ (Condition C-2c)

EXAMPLE 2

Step 4: The process follows the following procedure.
In the case of type A:

$R(s_i, t_j) \leftarrow 1$

In the case of type B:
$R(s_i, t_j) \leftarrow 1$

In the case of type C-1:

$R(s_i, t_j) \leftarrow 1: R(s_i-1, t_j) = 0,$ and $R(s_i, t_j-1) = 0$ (Condition C-1a)

$R(s_{i+1}, t_j) \leftarrow 1: R(s_i-1, t_j) = 0,$ and $R(s_i, t_j-1) = 1$ (Condition C-1b)

$R(s_i, t_{j+1}) \leftarrow 1: R(s_i-1, t_j) = 1,$ and $R(s_i, t_j-1) = 0$ (Condition C-c)

In the case of type C-2:
$R(s_i, t_j) \leftarrow 1: R(s_i-1, t_j) + R(s_i+1, t_j) = 0,$ and $R(s_i, t_j-1) = 0$ (Condition C-2a)

$R(s_{i-1}, t_j) \leftarrow 1: R(s_i+1, t_j) = 0,$ and $R(s_i, t_j-1) = 1$ (Condition C-2b)

$R(s_i, t_{j+1}) \leftarrow 1: R(s_i+1, t_j) = 1,$ and $R(s_i t_j 1) = 0$ (Condition C-2c)

As described above in detail, the present invention prevents thin lines from being erased during the reduction of a picture. Besides, blurring of thin lines including oblique lines appreciably decreases than in the prior art. Accordingly, the present invention substantially improves degradation of the picture quality during the reduction of a picture which are caused by the erasure and blurring of thin lines in the prior art.

What we claim is:
1. A binary picture reducing method comprising:
a first step of dividing an original picture into blocks each having a pattern matrix composed of a predetermined number of picture elements for extracting a plurality of binary picture blocks;
a second step wherein, when individual blocks of the plurality of binary picture blocks each agree with a predetermined thin line pattern including an oblique line, detecting each individual binary picture block as a thin line block; and
a third step wherein each thin line block detected is retained on an output picture at a position corresponding to a predetermined reduction ratio.
2. A binary picture reducing apparatus comprising:
blocking means for dividing an original picture into a plurality of blocks each of a pattern matrix composed of a predetermined number of picture elements to extract the blocks as binary picture blocks;
decision means for detecting, when the plurality of binary picture blocks each agree with a predetermined thin line pattern including an oblique line, each binary picture block as a thin line block; and
retaining means for retaining each thin line block detected on an output picture at a position corresponding to a predetermined reduction ratio.

* * * * *